MYRL LICHTENWALTER,
THOMAS H. COUR,
INVENTORS.

AGENT.

3,484,488
CONTROLLED PRODUCTION OF ETHYLENE AMINES
Myrl Lichtenwalter and Thomas H. Cour, Austin, Tex., assignors to Jefferson Chemical Company, Inc., Houston, Tex., a corporation of Delaware
Filed Feb. 28, 1967, Ser. No. 619,367
Int. Cl. C07c 87/16, 85/04, 87/20
U.S. Cl. 260—585                                        8 Claims

ABSTRACT OF THE DISCLOSURE

The reaction of ammonia with ethylene dichloride results in the production of ethylenediamine, higher polyethylene polyamines and residue. The reaction proceeds stepwise with $\beta$-chloroethylamine being formed as an intermediate. When the reaction begins, the concentration of $\beta$-chloroethylamine is zero, but increases to some maximum value and then decreases to near zero again as the reaction proceeds. The yield of higher polyethylene polyamines can be increased without a corresponding increase in the yield of residue by recycling one or more of the product amines to the reactor when the concentration of $\beta$-chloroethylamine is at or near its maximum.

BACKGROUND OF THE INVENTION

This invention is concerned with a method for increasing the production of the higher ethylene amines obtained as by-products in the production of ethylenediamine from ethylene dichloride and ammonia without a corresponding increase in the amount of residue produced.

The production of ethylenediamine from ethylene dichloride and ammonia is well known. In addition to ethylenediamine, this process results in the formation of higher homologues such as diethylenetriamine, triethylenetetraamine, tetraethylenepentamine and pentaethylenehexamine as well as a small amount of a high-boiling amine residue that cannot be separated into pure components and is not as valuable as the pure compounds.

At times, the demand for the higher homologues exceeds the demand for ethylenediamine, and efforts have been made to increase the relative amounts of the higher components produced. One way in which this can be done is by decreasing the molecular ratio of ammonia to ethylene dichloride employed in the reaction. However, this method is undesirable since it also results in an increase in the high-boiling residue from the process.

In U.S. Patent 2,769,841 there is described a method for decreasing the production of diethylenetriamine while increasing the production of the higher homologues. In accordance with this method, diethylenetriamine is recycled and fed to the reactor with the ethylene dichloride and ammonia. This procedure suffers from the disadvantage that the production of undesirable vinyl chloride is increased and the amount of high-boiling residue is increased.

SUMMARY OF THE INVENTION

We have now discovered a method whereby the higher homologues may be produced in increased amounts without a corresponding increase in the production of high-boiling residue. In accordance with our procedure, any of the products from the reaction, or mixtures thereof, is recycled by injection into the reactor at a point at which the concentration of $\beta$-chloroethylamine is at least 70% of its maximum value, and preferably at least 80% of its maximum value. Best results are obtained as the point of injection more nearly approaches the point of maximum concentration of $\beta$-chloroethylamine. The most preferred injection point is that at which the concentration has just started to decrease.

When ethylene dichloride is reacted with ammonia to form ethylenediamine, the reaction does not proceed immediately in one step but rather is a stepwise process. An intermediate in this process is $\beta$-chloroethylamine which is produced by the reaction of one mol of ammonia with one mol of ethylene dichloride. Ethylenediamine is then formed from this intermediate by reaction with another mol of ammonia. The intermediate $\beta$-chloroethylamine may also react with ethylenediamine or higher ethylene amines present in the reactor to produce diethylenetriamine and higher homologues. At the beginning of the reaction, the reactor will contain only ethylene dichloride and ammonia with no chloroethylamine being present. As the reaction proceeds, the amount of chloroethylamine present will increase to some maximum value and then will decrease as the reaction proceeds. The time at which the chloroethylamine concentration is at a maximum will depend upon a number of variables including the molar ratio of ammonia to ethylene dichloride and the temperature. For any given set of conditions this time may be readily determined by analyzing samples taken from the reactor periodically.

BRIEF DESCRIPTION OF THE DRAWINGS

The formation and disappearance of $\beta$-chloroethylamine with time will be further illustrated with reference to the accompanying drawings. These figures show the concentration in mols per liter of ethylene dichloride, inorganic chloride and $\beta$-chloroethylamine versus time for batch runs made at 80° and 90° C. using an ammonia to ethylene dichloride mol ratio of 26:1.

Figure 1:
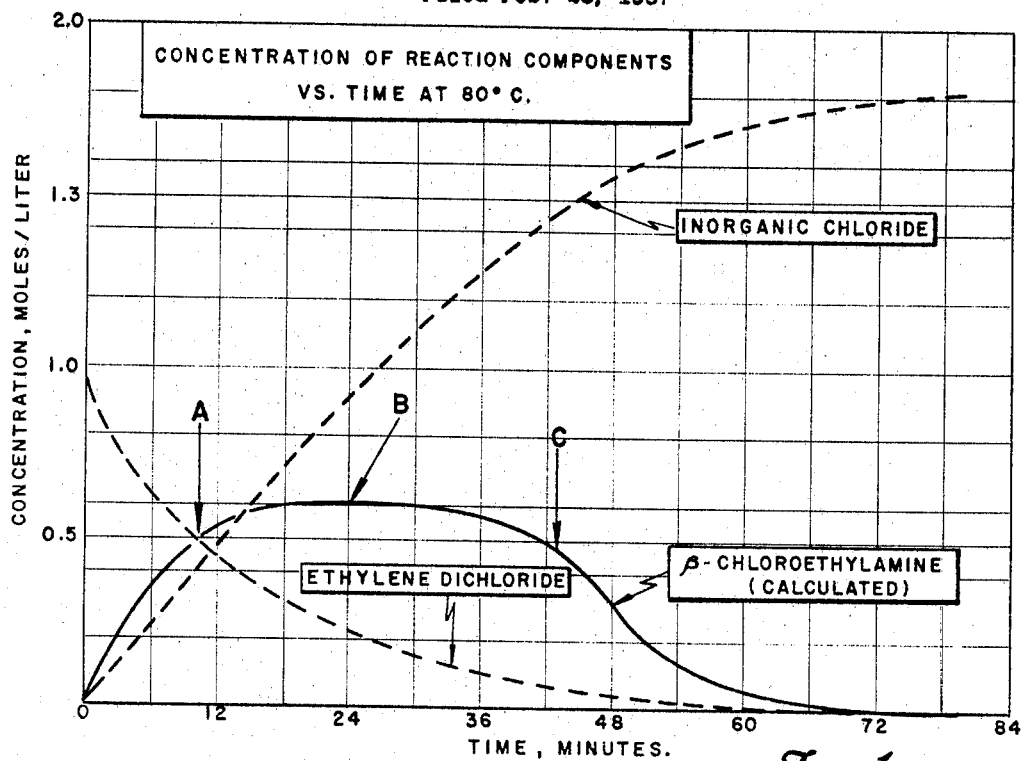
With reference to FIGURE 1, it can be seen that the concentration of $\beta$-chloroethylamine was zero at the beginning of the reaction, increasing to a maximum of 0.6 mol per liter at 24 minutes (point B). From this point on, the concentration decreased, approaching zero again at 72 minutes. In accordance with the present invention, the recycle stream may be added at any time the concentration of $\beta$-chloroethylamine is at least 70%, and preferably at least 80%, of its maximum value of 0.6 mol per liter. Thus, in the preferred embodiment the recycle stream may be added at any time the concentration is 0.48 mol per liter or higher, as it is between points A and C. For this particular run the addition of the recycle stream could be over the relatively wide span of from about 10 to about 43 minutes with best results obtained at a time immediately following B, when the concentration has just started decreasing.
Figure 2:
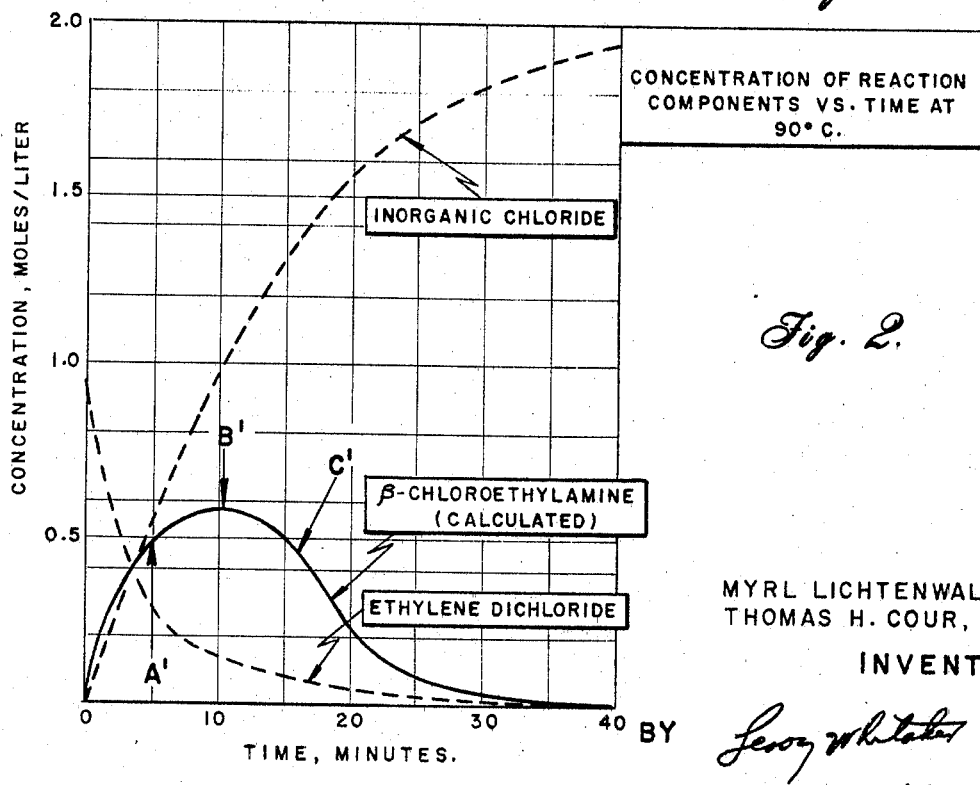
With reference to FIGURE 2, it can be seen that at 90° C. the concentration curve for $\beta$-chloroethylamine is not as flat as that obtained at 80° C. The maximum concentration of 0.58 mol per liter occurs at 10 minutes (point B') and, in the preferred embodiment, addition of the recycle stream may be made at any time between points A' and C' or between about 5 and 16 minutes, while the concentration is 0.464 mol per liter or higher.

Although FIGURES 1 and 2 were prepared from batch runs, similar graphs can be prepared for continuous runs. For continuous runs it may be more convenient to plot concentration as a function of reactor length rather than time.

DESCRIPTION OF THE PREFERRED EMBODIMENT

In the practice of our invention, one or more products of the reaction is recycled to the reactor at the time when the chloroethylamine concentration is at least 70%, and preferably at least 80%, of its maximum value to increase the production of usable higher ethylene amines without a corresponding increase in the less valuable high-boiling residue. In a batch process the recycle will be controlled by time, whereas in the preferred continuous process the recycle will be to a particular point in the reactor at which the chloroethylamine concentration is at least 80% of maximum. As stated hereinabove, this point will vary with varying reaction conditions; however, it is within the skill of the art to determine the point at which the chloroethylamine concentration is at its maximum.

Our invention will be further illustrated by the following example:

EXAMPLE

A jacketed tubular reactor 2" in diameter and 237" long was equipped with feed pumps, a preheater, product cooler, pressure and temperature controllers, and feed and product storage vessels. The piping was arranged such that ethylene dichloride was pumped directly to the bottom of the reactor and 65% aqueous ammonia was pumped through a preheater which heated the ammonia feed stream to about 100° C. and mixed with the ethylene dichloride at the reactor inlet. Recycle amine could be fed to the reactor at the inlet or through a nozzle located about 65" from the bottom of the reactor. The latter point is the point at which the chloroethylamine concentration was at a maximum under the conditions employed in the runs. The reactor temperature was controlled in the range of 90° to 100° C., and a reactor pressure of 700 p.s.i.g. was maintained. Reactor effluent was held in product tanks until the run was completed, after which time the entire content was transferred to a batch still where most of the ammonia was removed. A 12,000 gram sample of the ammonia-stripped reactor effluent was neutralized with 50% caustic soda, the resulting sodium chloride was removed and the product distilled into narrow-boiling fractions. Each fraction was then analyzed for amine content and the product distribution and yields were determined. Runs were conducted in which ethylenediamine, diethylenetriamine, or triethylenetetramine were fed to the reactor to simulate recycle amine. A control run with no recycle was also conducted. The results of several runs are summarized in the table.

are ethylenediamine, diethylenetriamine, triethylenetetramine, and mixtures thereof. It is to be understood, of course, that one or more of the other amines may also be recycled. The amount of amines to be recycled will depend upon the product distribution desired. The amount of recycle is also limited by the amount of the amine to be recycled which is produced in the reaction unless a particular amine is accumulated from a number of runs for recycling in one run. Thus, the amount of amine recycles will depend both on the particular amine chosen for recycle and the desired product distribution. One skilled in the art can readily determine the amount of recycle necessary by making one or two short runs to determine the product distribution at various recycle rates.

The conditions under which the reaction is run are not important to our process. The process is generally applicable to the preparation of ethylene amines from the reaction of ethylene dichloride with ammonia.

What is claimed is:

1. In a method for the preparation of ethylene amines from ethylene dichloride and ammonia, the improvement which comprises recycling at least one product amine to the reactor at a point at which the concentration of intermediate $\beta$-chloroethylamine is at least 70% of its maximum value.

2. A method as in claim 1 wherein the recycle is to a point at which the concentration of $\beta$-chloroethylamine is at least 80% of its maximum value.

3. A method as in claim 2 wherein the recycled amine is selected from the class consisting of ethylenediamine, diethylenetriamine, triethylenetetramine, and mixtures thereof.

4. A method as in claim 3 wherein the recycled amine is ethylenediamine.

5. A method as in claim 3 wherein the recycled amine is diethylenetriamine.

6. A method as in claim 3 wherein the recycled amine is a mixture of ethylenediamine and diethylenetriamine.

7. A method as in claim 1 wherein the recycle is to the point at which the concentration of $\beta$-chloroethyl-

TABLE

| Run number | 1 | 2 | 3 | 4 | 5 | 6 | 7 | 8 |
|---|---|---|---|---|---|---|---|---|
| $NH_3$/EDC mol ratio | 15 | 15 | 15 | 15 | 15 | 5 | 15 | 15 |
| $NH_3$ concentration, percent | 65 | 65 | 65 | 65 | 65 | 65 | 65 | 65 |
| Recycle injection point | None | (¹) | (¹) | (¹) | (¹) | (¹) | (¹) | (²) |
| Recycle amine (lbs. per lb. EDC): | | | | | | | | |
| Ethylenediamine | | 0.094 | 0.551 | | | | | |
| Diethylenetriamine | | | | 0.198 | 0.069 | | | 0.078 |
| Triethylenetetramine | | | | | | 0.051 | 0.104 | |
| Production rate (lbs. per 100 lbs. EDC): | | | | | | | | |
| Ethylenediamine | 24.1 | 20.4 | −6.2 | 24.4 | 19.6 | 24.6 | 25.1 | 27.2 |
| Diethylenetriamine | 8.7 | 9.8 | 14.2 | −3.8 | 7.6 | 8.0 | 7.0 | 6.4 |
| Triethylenetetramine | 5.7 | 6.8 | 12.7 | 9.9 | 8.7 | 3.3 | 0.1 | 6.2 |
| Tetraethylenepentamine and pentaethylenehexamine | 4.9 | 6.7 | 11.0 | 8.4 | 5.8 | 7.9 | 10.2 | 6.8 |
| Residue | 2.8 | 2.0 | 3.7 | 4.6 | 3.5 | 2.8 | 3.7 | 4.2 |

¹ At point in reactor where $\beta$-chloroethylamine concentration is at a maximum.  ² At reactor inlet.

The negative numbers in the table indicate that the amount of that product recovered was less than the amount fed as recycle, indicating overall consumption of the product. Thus, it would be possible to recycle a product that is in oversupply to extinction.

Run 8, in which diethylenetriamine was recycled to the reactor inlet, shows a residue buildup greater than that for any run other than Run 4. It is to be noted that the increase in higher amines in Run 8 was much less than that in Run 4. In the other runs, the increase in residue over that produced in Run 1, wherein there was no recycle, was relatively minor, whereas there were significant increases in the production of higher polyamines with the exception, of course, of the amine being recycled.

Since it is most desirable to increase the relative yields of triethylenetetramine, tetraethylenepentamine and pentaethylenehexamine, the preferred products for recycle amine has just started to decrease after having reached the maximum.

8. A method as in claim 7 wherein the recycled amine is selected from the class consisting of ethylenediamine, diethylenetriamine, triethylenetetramine, and mixtures thereof.

References Cited

UNITED STATES PATENTS 2,769,841  11/1956  Dylewski et al.

CHARLES B. PARKER, Primary Examiner

R. L. RAYMOND, Assistant Examiner

U.S. Cl. X.R.

260—583